(12) United States Patent
Grablowitz et al.

(10) Patent No.: US 9,404,020 B2
(45) Date of Patent: Aug. 2, 2016

(54) AQUEOUS BLOCKED POLYURETHANE-UREA DISPERSION

(71) Applicant: Bayer MaterialScience AG, Leverkusen (DE)

(72) Inventors: Hans-Georg Grablowitz, Köln (DE); Thomas Feller, Solingen (DE); Thomas Michaelis, Leverkusen (DE); Tanja Hebestreit, Wipperfürth (DE); Ingo Gipperich, Leverkusen (DE)

(73) Assignee: Covestro Deutschland AG (DE)

( * ) Notice: Subject to any disclaimer, the term of this patent is extended or adjusted under 35 U.S.C. 154(b) by 0 days.

(21) Appl. No.: 14/400,680

(22) PCT Filed: May 22, 2013

(86) PCT No.: PCT/EP2013/060445
§ 371 (c)(1),
(2) Date: Nov. 12, 2014

(87) PCT Pub. No.: WO2013/174830
PCT Pub. Date: Nov. 28, 2013

(65) Prior Publication Data
US 2015/0141573 A1 May 21, 2015

(30) Foreign Application Priority Data
May 24, 2012 (EP) .................................. 12169302

(51) Int. Cl.
*C08G 18/00* (2006.01)
*C09D 175/04* (2006.01)
*C09D 175/12* (2006.01)
*C08G 18/80* (2006.01)
*C08G 18/08* (2006.01)
*C08G 18/32* (2006.01)

(52) U.S. Cl.
CPC .......... *C09D 175/12* (2013.01); *C08G 18/0823* (2013.01); *C08G 18/3262* (2013.01); *C08G 18/8083* (2013.01); *C09D 175/04* (2013.01)

(58) Field of Classification Search
CPC ............... C09D 175/12; C09D 175/04; C08G 18/8083; C08G 18/0823; C08G 18/3262
USPC ....................................................... 524/839
See application file for complete search history.

(56) References Cited

FOREIGN PATENT DOCUMENTS

| EP | 0568976 | A1 | 11/1993 |
|----|---------|----|---------|
| WO | WO-9712924 | A1 | 4/1997 |
| WO | WO-0059979 | A1 | 10/2000 |
| WO | WO 0059979 | A1 * | 10/2000 |
| WO | WO-2009059697 | A1 | 5/2009 |

* cited by examiner

*Primary Examiner* — Kelechi Egwim
(74) *Attorney, Agent, or Firm* — Drinker Biddle & Reath LLP

(57) ABSTRACT

The present invention relates to an aqueous blocked polyurethaneurea dispersion which is obtainable by reacting at least one polyisocyanate, one blocking agent for isocyanate groups, one polyamine having at least one carboxyl and/or carboxylate group, and water. Additionally provided by the invention are a coating composition comprising the aqueous blocked polyurethaneurea dispersion, the use of the aqueous blocked polyurethaneurea dispersion or of the coating composition for producing a coating, a coating obtainable using the aqueous blocked polyurethaneurea dispersion or the coating composition, and a method for producing the aqueous blocked polyurethaneurea dispersion.

17 Claims, No Drawings

AQUEOUS BLOCKED POLYURETHANE-UREA DISPERSION

CROSS-REFERENCE TO RELATED APPLICATIONS

This application is a national stage application (under 35 U.S.C. §371) of PCT/EP2013/060445, filed May 22, 2013, which claims benefit of European Application No. 12169302.2, filed May 24, 2012, both of which are incorporated herein by reference in their entirety.

The present invention relates to an aqueous blocked polyurethaneurea dispersion, a coating composition comprising the aqueous blocked polyurethaneurea dispersion, the use of the aqueous blocked polyurethaneurea dispersion or of the coating composition for producing a coating, a coating obtainable using the aqueous blocked polyurethaneurea dispersion or the coating composition, and a method for producing the aqueous blocked polyurethaneurea dispersion.

Known in the prior art are aqueous blocked polyurethaneurea dispersions obtainable by reaction of polyols, polyisocyanates, hydrophilizing agents, blocking agents for isocyanate groups, chain extenders, and water. Systems of this kind are described for example in DE 199 14 885 A1 and in WO 97/12924. The uses of these systems include the production of coatings. The known coatings, however, frequently lack the desired stability with respect to aqueous alkalis.

Suitable blocking agents include in principle various isocyanate-reactive compounds such as, for example, ε-caprolactam, butanone oxime, triazole or malonic esters which undergo deblocking at different temperatures. In many coating operations, low operating temperatures play an important part in minimizing the energy costs. For this reason there is a need for products having a relatively low deblocking temperature. For reasons of workplace safety, furthermore, blocking agents that are less toxicologically objectionable are likewise preferred.

It was therefore an object of the present invention to provide an aqueous blocked polyurethaneurea dispersion which can be used to produce coatings with particular resistance to aqueous alkalis and which at the same time undergoes deblocking at relatively low temperatures. Deblocking is preferably to take place below 130° C.

This object is achieved in accordance with the invention by means of an aqueous, blocked polyurethaneurea dispersion which is obtainable by reaction of at least
 a) a polyisocyanate,
 b) a blocking agent for isocyanate groups,
 c) a polyamine having at least one carboxyl and/or carboxylate group,
 d) water, the blocking agent b) comprising or consisting of 3,5-dimethylpyrazole.

Presently considered polyisocyanates are compounds which have NCO groups.

The polyisocyanate a) may have a number-average molecular weight of 140 to 1500 g/mol and preferably of 168 to 700 g/mol.

According to one preferred embodiment of the invention the polyisocyanate a) has an isocyanate functionality of ≥2 and ≤6, preferably of ≥3 and ≤5 and more preferably of ≥3 and ≤4.

The polyisocyanate a) may have an NCO groups content of 15 to 30, preferably of 18 to 25 and more preferably of 20 to 24 wt %, based on the number-average molar weight of the polyisocyanate.

Suitable polyisocyanates are, for example, hexamethylene diisocyanate (HDI), isophorone diisocyanate (IPDI), 4,4'-diisocyanatodicyclohexylmethane ($H_{12}MDI$), butane 1,4-diisocyanate, hexahydrodiisocyanatotoluene, 1,3-bishydroxymethylcyclohexane, hexahydrodiisocyanatoxylene, nonane triisocyanate. Particularly preferred is the use of isophorone diisocyanate, hexamethylene diisocyanate and/or 4,4'-diisocyanatodicyclohexylmethane.

Likewise suitable, though less preferred, are aromatic isocyanates such as 2,4- or 2,6-diisocyanatotoluene (TDI), xylylene diisocyanate and 4,4'-diisocyanatodiphenylmethane.

Polyisocyanates based on the above isocyanates with uretdione, biuret, allophanate, isocyanurate, iminoxadiazinedione or urethane structural units may likewise be used.

The polyisocyanate a) preferably comprises aliphatic polyisocyanates, preferably hexamethylene diisocyanate and more preferably trimers of hexamethylene diisocyanate.

A blocking agent is understood presently to comprehend compounds which react with an isocyanate group and can be eliminated from that group again under defined conditions.

The blocking agent b) is used preferably with a fraction of >70 mol %, more preferably of ≥75 mol %, based on the isocyanate groups of component a).

It is also advantageous if the ratio of blocked to non-blocked isocyanate groups in the aqueous blocked polyurethaneurea dispersion is 2.2:1 to 6.5:1, preferably 2.5:1 to 6:1 and more preferably 3.0:1 to 5.5:1.

Considered polyamines in the sense of the invention are compounds which have amine groups.

The polyamine may preferably have a molecular weight of 50 to 400 g/mol and more preferably of 100 to 200 g/mol.

The polyamine c) may preferably have a functionality in terms of primary and/or secondary amine groups of ≥2 and ≤6, more preferably of ≥2 and ≤5 and very preferably of ≥2 and ≤3.

According to another embodiment of the invention the polyamine c) may have a carboxyl and/or carboxylate functionality of ≥1 and ≤3, preferably of ≥1 and ≤2 and more preferably of 1.

Particularly good results are also obtained if the carboxylate group is an alkali metal carboxylate group and preferably a sodium carboxylate group.

Examples of polyamines c) are piperazine-2-carboxylic acid, N-(2-aminoethyl)-β-alanine, N-(aminoacetyl)-aspartate, tryptophan, glutamine, lysine and histidine.

One preferred embodiment of the invention, when preparing the aqueous blocked polyurethaneurea dispersion, uses exclusively polyamines which carry carboxyl and/or carboxylate groups.

Another preferred embodiment of the invention, when preparing the aqueous blocked polyurethaneurea dispersion, uses exclusively polyamines which have a molecular weight of <1000 g/mol, preferably ≤750 g/mol and more preferably ≤500 g/mol.

It is also advantageous if the aqueous blocked polyurethane urea dispersion is exclusively anionically hydrophilized. This means that the polyurethaneurea dispersion is not cationically and/or nonionically hydrophilized, i.e. does not have any such groups.

Additionally, when preparing the aqueous blocked polyurethaneurea dispersion of the invention, it is also possible for the following further components to be reacted as well: polyols with a functionality of ≥2 and ≤6 and a number-average molecular weight of 500-6000 g/mol; this includes the commonly used polyether, polyester and polycarbonate polyols and mixtures thereof. Polyols with a functionality of ≥2 and ≤6 and a number-average molecular weight of <300 g/mol such as, for example, 1,4-butanediol, 1,6-hexanediol, cyclohexanedimethanol, trimethylolpropane, etc. Polyamines and/or polyhydrazides and/or hydrazine without carboxyl function and with a functionality of ≥2 and ≤6 and a molar mass <250 g/mol such as, for example, ethylenediamine, 1,6-diaminohexane, isophoronediamine, hydrazine hydrate, adipic dihydrazide etc.

The invention further provides a coating composition comprising at least one aqueous blocked polyurethaneurea dispersion of the invention and a non-reactive polyurethane dispersion e) and/or an isocyanate reactive compound f).

A non-reactive polyurethane dispersion e) in the present context means a polyurethane or a polyurethaneurea which is preferably in dispersion in water and which has exclusively groups that are slow to react with isocyanate groups. The groups that are slow to react with isocyanate groups are preferably urethane and/or urea and/or carboxylate and/or sulphonate groups. As a concomitant of the production operation it is possible for such dispersions to have small amounts of amine end groups.

Examples of non-reactive polyurethane dispersion e) are the following products marketed by Bayer MaterialScience AG: Impranil, Baybond and Bayhydrol UH-series products, such as, for example, Impranil DLS, Impranil DLN, Impranil DLC/F, Baybond PU 406, Baybond PU 330, Bayhydrol UH 340/1 etc.

Isocyanate-reactive compounds f) for the purposes of the invention are compounds which have isocyanate-reactive groups.

The isocyanate-reactive compound f) may have a functionality in terms of isocyanate-reactive groups of ≥2 and ≤6, preferably of ≥3 and ≤5 and more preferably of ≥3 and ≤4.

The isocyanate-reactive groups may preferably be selected from the group of OH, SH, NH, $NH_2$, $H_2N$—NH.

In a development of the coating composition of the invention, the isocyanate-reactive compound f) comprises a polyol and more particularly a polyacrylate polyol.

Examples of polyols are the following product marketed by Bayer MaterialScience AG: Bayhydrol A (polyacrylate polyols), Bayhydrol E (polyester polyols), Bayhydrol U (polyesterurethane polyols).

As polyacrylate polyols it is possible more particularly to use Bayhydrol A XP 2770 and Bayhydrol A XP 2470.

The coating composition of the invention may also comprise the following further constituents: Additives for the formulation of coating compositions, such as levelling agents, wetting agents, adhesion promoters, thickeners, antioxidants, colour pigments, pigments, coalescents, defoamers, deaerating agents, etc. It is also possible for other aqueous dispersions, not included under e) and f), to be mixed with the dispersions of the invention. Examples here are polyacrylate dispersions, polyvinyl acetate dispersions, poly(styrene-co-butadiene) dispersions, polyepoxy dispersions, etc.

Provided yet further by the invention is the use of an aqueous blocked polyurethaneurea dispersion of the invention or of a coating composition of the invention for producing a coating.

A coating obtainable using an aqueous blocked polyurethaneurea dispersion of the invention or a coating composition of the invention is also provided by the invention.

A particularly suitable substrate for the coating is glass, metal, sheet textiles (nonwovens, wovens, knitted fabrics, microporous coagulated materials), leather, fibres (glass fibres, carbon fibres, polyester fibres, cotton fibres, etc.), paper, wood and plastic.

Also provided by the invention, lastly, is a method for producing an aqueous blocked polyurethaneurea dispersion of the invention, wherein the polyisocyanate a) is reacted with the blocking agent b) to give a partly blocked polyisocyanate, and the partly blocked polyisocyanate is reacted with the polyamine c) to give hydrophilized polyurethaneurea, and this product is dispersed in water.

In this method the blocking agent b) may be introduced initially and the polyisocyanate a) added, or vice versa. Preferably, however, the blocking agent b) is added to the initially introduced polyisocyanate a).

Depending on its aggregate state, the blocking agent b) may also be employed in dissolved form, e.g. in acetone.

The reaction temperature ought to be selected such that the equilibrium of the reaction of the polyisocyanate a) with the blocking agent b) lies on the side of the formation of the blocked polyisocyanate.

If a solvent is used, it is removed by distillation again after dispersing has taken place, and in this context is preferred to make use of solvents having a low boiling temperature such as, for example, acetone, methyl ethyl ketone or ethyl acetate.

The polyamine c) may be added either in undiluted form or in dissolved form.

When the polyamine c) is added a portion of the water may already be added as well to the prepolymer, if the polyamine is in salt form.

In the method of the invention it is preferred for the blocking agent b) to be used with a fraction of >70 mol %, more preferably of ≥75 mol %, based on the isocyanate groups of component a).

It is also advantageous if in the method of the invention the blocking agent b) is used in an amount such that the ratio of blocked to non-blocked isocyanate groups in the aqueous blocked polyurethaneurea dispersion prepared is 2.2:1 to 6.5:1, preferably 2.5:1 to 6:1 and more preferably 3.0:1 to 5.5:1.

In one preferred embodiment of the invention the method of the invention, when preparing the aqueous blocked polyurethaneurea dispersion, uses exclusively polyamines which carry carboxyl and/or carboxylate groups.

In another preferred embodiment of the invention the method of the invention, when preparing the aqueous blocked polyurethaneurea dispersion, uses exclusively polyamines which have a molecular weight of <1000 g/mol, preferably ≤750 g/mol and more preferably ≤500 g/mol.

The invention further provides an aqueous blocked polyurethaneurea dispersion obtainable by the method of the invention.

The invention is elucidated in more detail below by means of examples.

Chemicals:

3,5-Dimethylpyrazole (DMP): Blocking agent (ALDRICH, DE)

Desmodur N3300: HDI trimer with a functionality of 3 and an NCO content of 21.8% (BAYER AG, Leverkusen)

Sodium N-(2-aminoethyl)-β-alaninate (KV 1386): Diamine with carboxylate function for hydrophilization (BAYER AG, Leverkusen)

Sodium N-(2-aminoethylsulphonate) (AAS salt): Diamine with sulphonate function for hydrophilization (BAYER AG, Leverkusen)

Sodium 1,4-butanediol-2-sulphonate (polyethersulphonate): Diol with sulphonate function for hydrophilization (BAYER AG, Leverkusen)

Caprolactam: Blocking agent (ALDRICH, DE)

Polypropylene oxide diol (DE 3600): Polyetherpolyol with a molar mass of 2000 g/mol (BAYER AG, Leverkusen)

Dimethylolpropionic acid (DMPA): Diol with carboxyl function for hydrophilization (ALDRICH, DE)

Bayhydur BL XP 2706: aqueous, solvent-free, blocked aliphatic polyisocyanate, neutralized with dimethylethanolamine (BAYER AG, Leverkusen)

Bayhydur BL X 2810: aqueous, solvent-free, blocked aliphatic polyisocyanate (BAYER AG, Leverkusen)

Bayhydrol A XP 2770: water-based polyacrylate polyol (BAYER AG, Leverkusen)

Sodium hydroxide (NaOH): Neutralizing agent (ALDRICH, DE)

Methods:

NCO titration: The NCO content was ascertained volumetrically in accordance with DIN EN ISO 11909

Viscosity: The viscosity was determined using a Haake viscometer at room temperature (23° C.) with a shear rate of 45 s-1.

Solids content: the solids content was performed according to an amended version relative to DIN-EN ISO 3251, since high drying temperatures led to partial deblocking and falsified the result. Approximately 1 g of the dispersion was placed in an aluminium boat and weighed, followed by drying at room temperature for at least 6 hours. The product was then dried at 50° C. for a further hour and the weight was determined again.

Temperature range for the elimination of the blocking agents: Thermogravimetric analysis was performed on a TGS-2 microthermobalance (Perkin-Elmer) under inert gas, with a heating rate of 20 K/min, using filmed specimens of the dispersion. For this purpose the dispersions, with a wet film thickness of 100 μm, were dried in a drying box at room temperature and 0% relative humidity for 87 hours, and filmed.

The temperature indicated in each case is the temperature at which there was a marked loss of mass as a result of the thermal decomposition of the sample.

Solvent resistance: A small amount of the relevant solvents (xylene, methoxypropyl acetate, ethyl acetate or acetone) is placed in a test tube and a cotton pad is placed at the opening, so that an atmosphere saturated with solvent forms within the test tube. The test tubes are subsequently brought with the cotton pad onto the surface of the coating, where they remain for 5 minutes. After the solvent had been wiped off, the film was examined for destruction/softening/loss of adhesion Cross-hatch: Cross-hatching on glass takes place in accordance with DIN ISO 2409, using a cutter with a spacing of 1 mm.

NaOH resistance: The coated glasses were stored for 8 hours at 70° C. in 5% strength NaOH solution, after which they were rinsed off with distilled water, dried and examined for visual changes (defects, clouding, etc.) and for any losses of adhesion (fingernail probe). A first interim inspection took place after just 5 hours.

Alcohol test: The coated glasses were stored in 40% ethanol for 4 hours. The coating film ought not to soften, detach or show visual damage.

EDC test: A cotton pad soaked with Eau de Cologne (Echt Kölnisch Wasser; EDC) was applied to the coated glasses and this system, covered with a closed container, was stored at room temperature for 24 hours. The colour ought not to bleed (white cloth), and the coating film must not show any softening (fingernail probe). The shade ought not to show any visual change. The test liquid ought not to show any colouration.

Immersion test: The coated glasses were stored in mains water at 40° C. for up to 10 days. A daily inspection was carried out to see there had been any change. (Softening, visual change, delamination)

PREPARATION OF THE DISPERSIONS

Example 1

Inventive

In a reaction vessel, 141.6 g of DMP were suspended in 150 g of acetone and heated to 50° C. The resultant solvent was admixed dropwise with 340.5 g of Desmodur N 3300 and stirred until the theoretical NCO value (=1.92%, DIN EN ISO 11909) was reached. Then 45.1 g of KV 1386 in 103 g of water were metered in over the course of 5 minutes, followed by stirring for 15 minutes. Thereafter 586 g of water were added and the acetone was removed by distillation. An aqueous dispersion was obtained which had a viscosity of 230 mPas and a solids content of 45.3 wt %.

A storage-stable PU dispersion was obtained for which the temperature range for the elimination of DMP to liberate the NCO groups, as determined by means of thermogravimetric analysis, began at about 97° C.

Example 2

Comparative Example

In a reaction vessel, 141.6 g of DMP were suspended in 150 g of acetone and heated to 50° C. The resultant solvent was admixed dropwise with 340.5 g of Desmodur N 3300 and stirred until the theoretical NCO value (=1.92%) was reached. Then 49.9 g of AAS salt in 103 g of water were metered in over the course of 5 minutes, followed by stirring for 15 minutes. Thereafter 586 g of water were added and the acetone was removed by distillation. A highly viscous paste-like composition was obtained which is not suitable for coatings.

A dispersion was not obtained (product too viscous).

Example 3

Comparative Example

In a reaction vessel, 141.6 g of DMP were suspended in 150 g of acetone and heated to 50° C. The resultant solvent was admixed dropwise with 340.5 g of Desmodur N 3300 and stirred until the theoretical NCO value (=1.92%) was reached. Then 50.5 g of polyethersulphonate in 105 g of water were metered in over the course of 5 minutes, followed by stirring for 15 minutes. Thereafter 420 g of water were added and the acetone was removed by distillation. A dispersion was obtained which in a very short time forms two phases and was therefore not suitable for producing coatings.

A stable dispersion was not obtained (two phases).

Example 4

Comparative Example

In a reaction vessel, 166.7 g of caprolactam were suspended in 150 g of acetone and heated to 50° C. The resultant solvent was admixed dropwise with 340.5 g of Desmodur N 3300 and stirred until the theoretical NCO value (=1.85%) was reached. Then 45.1 g of KV 1386 in 103 g of water were metered in over the course of 5 minutes, followed by stirring for 15 minutes. Thereafter 448 g of water were added and the acetone was removed by distillation. An aqueous dispersion was obtained which had a viscosity of 970 mPas and a solids content of 46.2 wt %.

A storage-stable PU dispersion was obtained, but its temperature range for the elimination of ε-caprolactam in order to liberate the NCO groups, as determined by means of thermogravimetric analysis, began only at around 145° C.

Example 5

Inventive

In a reaction vessel, 132 g of DMP and 100 g of DE 3600 were suspended in 150 g of acetone and heated to 50° C. The resultant solution was admixed dropwise with 340.5 g of Desmodur N 3300 and stirred until the theoretical NCO value (=1.68%) was reached. Then 45.1 g of KV 1386 in 103 g of water were metered in over the course of 5 minutes, followed by stirring for 15 minutes. Thereafter 448 g of water were added and the acetone was removed by distillation. An aqueous dispersion was obtained which had a viscosity of 970 mPas and a solids content of 46.2 wt %.

A storage-stable PU dispersion was obtained for which the temperature range for the elimination of DMP to liberate the NCO groups, as determined by means of thermogravimetric analysis, began at about 105° C.

Example 6

Counter-Example

In a reaction vessel, 122 g of DMP and 13.4 g of DMPA were suspended in 150 g of acetone and heated to 50° C. The resultant solution was admixed dropwise with 293 g of Desmodur N 3300 and stirred until the theoretical NCO value (=0.35%) was reached. Subsequently 8 g of NaOH in 471 g of water were metered in over the course of 5 minutes, followed by stirring for 15 minutes. Complete dispersing could not be accomplished, since thick deposits formed on the vessel walls.

A dispersion was not obtained (thick deposits).
Evaluation:

The counter-examples show that in accordance with the prior art it is not possible to prepare an aqueous, blocked polyisocyanate having carboxylate groups in amine-free form. The introduction of carboxyl functions via a correspondingly substituted diol, with subsequent neutralization of the carboxylic acid group, is not possible, as shown by Example 6. Counter-examples 2 and 3, in which SO₃Na groups are installed, demonstrate that low-viscosity dispersions are not obtainable by this route, such dispersions being needed in order to produce high-quality coatings.

Application Example from Glass Coating:

The coating compositions were produced by initially introducing the binders and stirring at room temperature for a number of minutes. For the purpose of viscosity adjustment it is possible, optionally, for water to be added. A short time before application, the adhesion promoter solution of the silanes in dipropylene glycol is then added with stirring. After not less than 5 minutes, the formulation is applied to a glass plate and subsequently dried at room temperature for 10 minutes and thereafter at 180° C. for 30 minutes.

| | | Polyol | |
| | | Bayhydrol A XP 2770 | |
| Crosslinker | Ex. 1 | Bayhydur BL 2810 XP | Bayhydur BL XP 2706 |
| Crosslinking ratio | | NCO═OH = 1.0 | |
| FORMULATION | | | |
| Bayhydrol A XP 2770, as-supplied form. | 55.16 | 44.54 | 42.49 |
| Ex. 1 | 42.24 | | |
| Bayhydur BL 2810 XP, as-supplied form. | | 53.06 | |
| Bayhydur BL XP 2706, as-supplied form. | | | 50.61 |
| Dest. Water | | | 4.50 |
| Adhesion promoter (1.2% silane based on resin solids) | | | |
| Silquest A 189, as-supplied form. | 0.26 | 0.24 | 0.24 |
| Dynasilan AMEO, as-supplied form. | 0.26 | 0.24 | 0.24 |
| Dipropylene glycol | 2.08 | 1.92 | 1.92 |
| | 100.00 | 100.00 | 100.00 |

| Crosslinker | | Imprafix 2794 XP | Bayhydur BL 2810 XP | Bayhydur BL XP 2706 |
|---|---|---|---|---|
| König pendulum hardness (DIN EN ISO 1522) | | 199 s | 207 s | 206 s |
| Yellowing b (DIN 6174) | | 0.3 | 0.5 | 0.6 |
| Solvent resistance 5' | | 0001 | 0012 | 0002 |
| Cross-hatch | | 0 | 0 | 0 |
| NaOH resistance | 5 h | 0 | 2 | 5 |
| | 8 h | 0 | 4 | — |
| Alcohol test | 40%/4 h | 0 | 2 | 2 |
| EDC | 24 h RT | 2 | 3 | 3 |
| Immersion test | 40° C. | >10 d | >10 d | >10 d |

Evaluation code:
0 = no change
5 = film destroyed

The application example above shows that the aqueous blocked polyurethaneurea dispersions of the invention can be used for producing coatings which relative to systems known from the prior art possess in particular a higher resistance with respect to aqueous alkalis (NaOH).

The invention claimed is:
1. An aqueous blocked polyurethaneurea dispersion obtained by reacting at least
   (a) one polyisocyanate,
   (b) one blocking agent for isocyanate groups,
   (c) one polyamine having at least one carboxyl and/or carboxylate group, and
   (d) water,
   wherein the blocking agent (b) comprises 3,5-dimethylpyrazole utilized in said reaction at a fraction of greater than 70 mol %, based on the isocyanate groups of polyisocyanate (a).
2. The aqueous blocked polyurethaneurea dispersion according to claim 1, wherein the polyisocyanate (a) has an isocyanate functionality of ≥2 and ≤6.
3. The aqueous blocked polyurethaneurea dispersion according to claim 1, wherein the polyisocyanate (a) comprises aliphatic polyisocyanates.
4. The aqueous blocked polyurethaneurea dispersion according to claim 1, wherein the polyisocyanate (a) has an NCO groups content of 15 to 30, based on the number-average molar weight of the polyisocyanate.
5. The aqueous blocked polyurethaneurea dispersion according to claim 1, wherein the polyamine (c) has a functionality in terms of primary and/or secondary amine groups of ≥2 and ≤6.

6. The aqueous blocked polyurethaneurea dispersion according to claim 1, wherein the polyamine (c) has a carboxyl and/or carboxylate functionality of ≥1 and ≤3.

7. The aqueous blocked polyurethaneurea dispersion according to claim 1, wherein the carboxylate group is an alkali metal carboxylate group.

8. The aqueous blocked polyurethaneurea dispersion according to claim 1, wherein the dispersion is exclusively anionically hydrophilized.

9. A coating composition comprising at least one aqueous blocked polyurethaneurea dispersion according to claim 1, and a non-reactive polyurethane dispersion (e) and/or an isocyanate-reactive compound (f).

10. The coating composition according to claim 9, wherein the isocyanate-reactive compound (f) has a functionality in terms of isocyanate-reactive groups of ≥2 and ≤6.

11. The coating composition according to claim 9, wherein the isocyanate-reactive groups of the isocyanate-reactive compound (f) are selected from the group consisting of OH, SH, NH, $NH_2$ and $H_2N$—NH.

12. The coating composition according to claim 9, wherein the isocyanate-reactive compound (f) comprises a polyol.

13. A method for producing a coating composition comprising utilizing an aqueous blocked polyurethaneurea dispersion according to claim 1.

14. A method for producing a coating composition comprising utilizing a coating composition according to claim 9.

15. A coating obtained by utilizing an aqueous blocked polyurethaneurea dispersion according to claim 1.

16. A coating obtained by utilizing a coating composition according to claim 9.

17. A method for producing an aqueous blocked polyurethaneurea dispersion comprising:

reacting at least one polyisocyanate with at least one blocking agent for isocyanate groups to provide a partly blocked polyisocyanate, said at least one blocking agent comprising 3,5-dimethylpyrazole, said blocking agent utilized in said reaction at a fraction greater than 70 mol %, based on the isocyanate groups of the polyisocyanate, and reacting the partly blocked polyisocyanate with at least one polyamine having at least one carboxyl and/or carboxylate group to give a hydrophilized polyurethaneurea, which is dispersed in water.

* * * * *